May 19, 1936.  J. E. SMITH  2,041,304
THERMOSTATIC SWITCH
Filed May 28, 1930  2 Sheets-Sheet 1
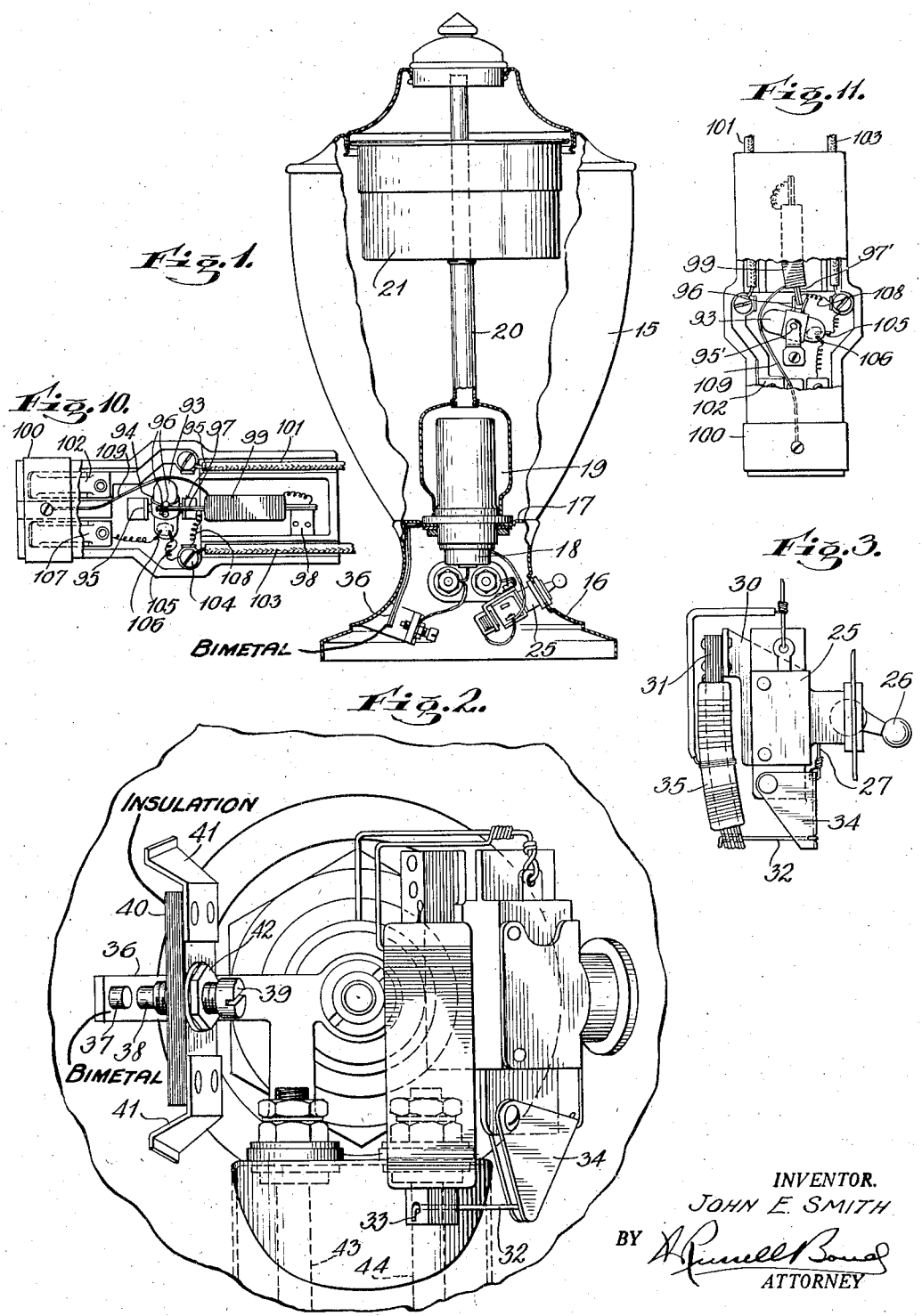
INVENTOR.
JOHN E. SMITH
BY
ATTORNEY

May 19, 1936. J. E. SMITH 2,041,304
THERMOSTATIC SWITCH
Filed May 28, 1930 2 Sheets-Sheet 2
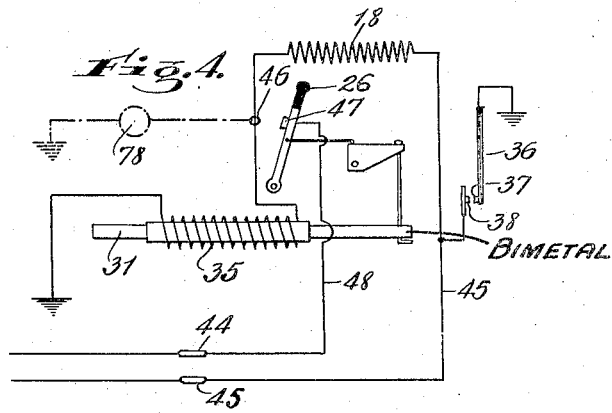
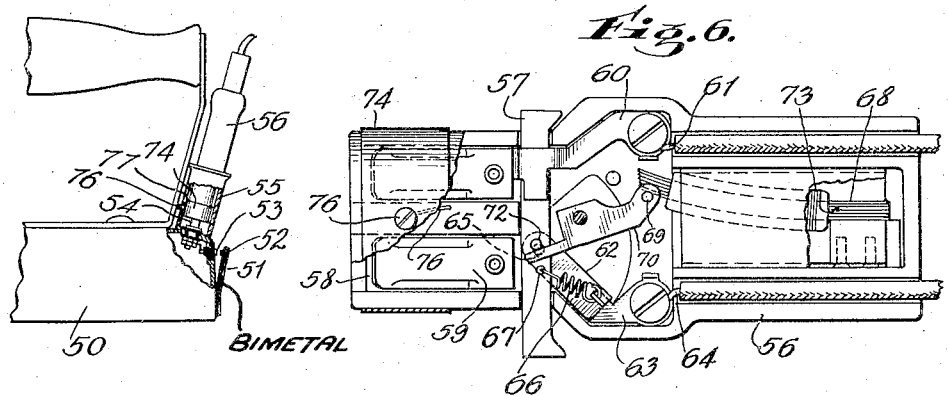
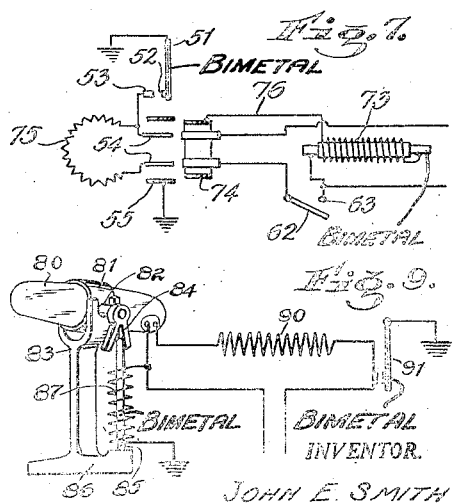
INVENTOR.
JOHN E. SMITH
BY
ATTORNEY Patented May 19, 1936

2,041,304

UNITED STATES PATENT OFFICE 2,041,304

THERMOSTATIC SWITCH

John E. Smith, Plainfield, N. J., assignor to Knapp-Monarch Company, a corporation of Missouri Application May 28, 1930, Serial No. 456,694

4 Claims. (Cl. 200—116)

My invention relates to electric switches and has for an object to provide a switch with thermostatic means for controlling the same.

A more specific object of the invention is to provide a switch with actuating means for throwing the switch and a thermostat for controlling the actuating means.

Another object of the invention is to provide a manually operable switch with an auxiliary thermostatic actuating means, and a thermostatic pilot switch for controlling the thermostatic actuating means.

Another object of my invention is to provide means for controlling a comparatively heavy current with a delicate thermostatic switch, the parts being so arranged that the current will be cut off on closure of the thermostatic switch so that there will be no current to be broken when the thermostatic switch is opened and sparking at the contact points thereof will be avoided.

My invention is particularly adapted for use in controlling the supply of current to a main electric resistance unit and a specific object of the invention is to provide a main switch in the circuit of said resistance unit, means for actuating the switch, said means comprising a thermostat and a local resistance for heating the same, said local resistance being controlled by the main switch and also by a thermostatic pilot switch so that the local resistance is inactive until the pilot switch is actuated by heat from the main electric resistance and then cuts off its own supply of current when it causes the main switch to open. It will be evident that in such an arrangement the pilot switch will not open until after the current has been cut off by the main switch.

Another object of the invention is to provide a local resistance of such capacity as to provide a predetermined time interval between the operation of the pilot switch and the operation of the main switch.

Another object of the invention is to provide a switch and actuator therefor which is incorporated in a plug connector so that it may be readily applied to different apparatus.

Other objects will appear in the following description of a preferred embodiment of my invention and of certain modifications thereof and thereafter the novelty and scope of the invention will be pointed out in the claims.

In the accompanying drawings;

Figure 1 is a view in front elevation of a coffee percolator partly broken away and partly in section showing my automatic switch mechanism applied thereto;

Fig. 2 is a fragmentary bottom plan view of the same;

Fig. 3 is a detail view of the main switch and thermostatic actuator therefor;

Fig. 4 is a diagram of electrical connections used in the arrangement shown in Figs. 1 and 2;

Fig. 5 is a fragmentary view of an electric flat iron showing another form of my invention wherein the main switch and actuator are incorporated in a switch plug;

Fig. 6 is a view mainly in longitudinal section but on a much larger scale of the switch plug shown in Fig. 5;

Fig. 7 is a diagram of electrical connections employed in the embodiment shown in Figs. 5 and 6;

Fig. 8 is a side elevation partly in section of a waffle iron equipped with my automatic switch mechanism;

Fig. 9 is a view partly in perspective and partly diagrammatic of my invention as applied to a mercury switch; and Figs. 10 and 11 are views mainly in longitudinal section illustrating my invention embodied in a connection plug wherein a mercury switch is employed, Fig. 10 showing a plug adapted to be used in horizontal position, and Fig. 11 a plug adapted to be used in vertical position.

In Fig. 1, I have illustrated my invention as applied to a coffee percolator of standard type comprising a receptacle 15 supported on a hollow base 16 and separated therefrom by a diaphragm 17. An electric resistance unit 18 projects through the diaphragm into a pump chamber 19 in the receptacle. Water entering said chamber from the receptacle 15 is locally heated by the resistance unit and steam bubbles are formed which cause the water to spurt up a central tube 20 and overflow into a perforated container or basket 21. The water then percolates through the ground coffee in said basket and drops back into the main receptacle. The percolating starts before the main body of water in the receptacle is materially heated and will continue as long as current is supplied to the heating unit. The strength of the coffee extract depends upon the length of time the current is kept on and it is desirable to turn off the current automatically when a predetermined strength of extract is obtained. The temperature of the main body of liquid in the receptacle provides a gage to determine when the current should be cut off and I employ the heat of said liquid to initiate the opening of the circuit of the main resistance unit, as will be described hereinafter.

A toggle switch of standard type is housed in a casing 25 mounted within the hollow base 16. This switch has a handle 26 projecting outward from the base. The exact construction of the switch is immaterial to my invention but it is desirable that it be a snap switch. Suffice it to state that in addition to the switch handle, I provide a link 27 for throwing the switch. This link projects laterally from the casing 25 and within the hollow base 16 and is connected to the switch handle. When the switch is closed by operating the handle 26, the link 27 is retracted and by pulling said link the switch may be opened and the handle swung to "off" position.

The switch casing 25 is supported on a bracket 30 and secured to this bracket is a comparatively powerful thermostat 31 in the form of a bar made up of a plurality of bimetallic laminae. The bar is fixed at one end to the bracket 30 and the other end is formed with an aperture through which passes a rod 32. One end of the rod is bent to form a head which normally engages the outer face of the thermostat (see Fig. 2), while the other end is connected to one corner of a triangular plate or lever 34. Another corner of said lever is connected to the link 27 and the lever is fulcrumed at its third corner to the switch casing 25. The parts are so proportioned that when the switch handle is turned to "on" position, the thermostatic bar 31 will be flexed as shown in Fig. 3, by the retraction of the link 27. When the bar is heated it will tend to straighten and when its temperature is raised to a predetermined degree it will develop power sufficient to rock the lever 34 on its fulcrum, pulling the link 27 and throwing the link to "off" position. To avoid confusion, I shall hereafter call the thermostatic element 31 an "actuator", so as to distinguish from another thermostat presently to be described. In order to heat the actuator, I wrap a coil 35 of resistance wire thereabout said actuator.

In the circuit of the heating coil 35, I provide a thermostatic switch which I shall hereafter call the "pilot switch". This pilot switch comprises a bimetallic switch arm 36 secured to the outer face of the diaphragm 17. This switch arm will thus be flexed by heat from the receptacle 15. The free end of the switch arm carries an electric contact point 37 which is adapted to engage an opposed contact point 38 when said switch arm is sufficiently flexed. The contact point 38 is carried by a screw 39 which is threaded through a block 40 of insulation material carried by brackets 41 secured to the inner face of the base 16. The screw 39 may be turned to adjust the normal gap between the contact points 37 and 38, so as to regulate the temperature at which the pilot switch will close. A lock nut 42 serves to hold the contact point 38 at the desired adjustment.

The base 16 carries a pair of terminal pins or prongs 43 and 44 respectively, adapted to engage sockets in a plug through which the current is admitted to the apparatus. As shown in Fig. 4, the terminal 43 is connected by a line 45 to one end of the main resistance unit 18. The other end of said resistance unit is connected to a fixed contact point 46 of the main switch. The opposed contact point 47 movable by the switch handle 26, is connected by a wire 48 to the terminal 44. The pilot switch point 38 is connected to the line 45, while the switch point 37 is grounded through the switch arm 36 to the percolator. The heating coil 35 is connected at one end to the main switch point 46, while the other end is grounded to the percolator.

The operation of the device is as follows: Current is turned on to the main resistance unit 18 by throwing the switch handle 26 thereby flexing the actuator 31. However, no current passes through the heating coil 35 because the ground is not connected to power. In due course, the temperature of the water in the receptacle 15 will rise to a predetermined degree sufficient to flex the pilot switch and close the contacts 37 and 38. This will energize the ground and consequently current will flow through the heating coil 35 in parallel with the resistance unit 18. The actuator when heated sufficiently will pull the main switch open, thereby deenergizing the resistance unit 18 and also the heating coil 35. The heating coil 35 is preferably so wound that a predetermined time interval will take place after the pilot switch has been closed before the actuator will develop sufficient power to open the main switch. It will be observed that the pilot switch closes the circuit through the coil 35 but the coil 35 is disconnected from power by the opening of the main switch. Consequently, by the time the pilot switch opens, which will not take place until the temperature in the receptacle 15 has been lowered, the current will already have been cut off from the coil 35 and there will be no sparking across the contact points 37 and 38.

The construction just described is particularly applicable to apparatus where the actuator is not subjected to a high temperature. As explained above, the percolator shown in Fig. 1 is of the type in which the pumping is effected by local heating and the entire body of liquid in the receptacle 15 is not brought to a high temperature until about the time that it is desired to cut off the current. In other forms of percolators where the entire body of liquid in the main receptacle must be brought up close to the boiling temperature before the percolating starts, it is desirable to use a construction in which the main switch and actuator are not built into the apparatus, and in which the pilot switch is located outside the apparatus so as to retard the heating thereof. The same applies to other apparatus besides percolators and to illustrate my invention, I have shown such a construction adapted to be used on a flat iron.

As shown in Fig. 5, a pilot switch is mounted on the outside of the iron 50. The switch comprises a strip of thermostatic metal 51 carrying a contact point 52 which is adapted to engage a contact point 53 when a desired temperature has been reached. The contact point 53 is insulated from the main body of the iron 50 and is connected to one of the prongs 54 of the plug switch. These prongs project from a socket casing 55 adapted to receive a connection plug 56. The construction of the plug is shown in Fig. 6 and is of a type embodying a switch controlled by a transverse push bar 57 adapted to be pushed back and forth between "off" and "on" position. In the drawings, the switch is shown in "on" position. The exact construction of the switch proper is immaterial to my invention but, as shown in the drawings, it comprises a pair of sockets 58 in which the prongs 54 are received. The sockets are provided with the usual contact members 59, one of which is connected by a strip of conducting material 60 to a feed wire 61 while the other is connected to a switch blade 62. The latter may be swung into and out of engagement with a contact plate 63 connected to the other feed wire 64. The blade 62 is pivoted at 65 to the casing of the plug, and a spring 66 is connected at one end to the outer end of the blade 62 and at the other end to the push bar 57 at the point 67. By moving the bar 57, the point 67 is carried to one side or the other of the pivot 65, thereby causing the blade 62 to snap into "on" and "off" position. Within the plug casing, I provide a thermostatic actuator 68 which is of the same type as that shown at 31 in Fig. 3. One end of this actuator is fixed to the casing, while the other end bears against a pin 69 on one end of a lever 70. The other end of the lever engages a pin 72 on the rod 57. Surrounding the actuator 68 is a heating coil 73. Surrounding the socket portion of the plug is a band 74 of conducting material which is adapted to engage the casing 55 when the plug is applied to the iron.

The operation of the apparatus will be understood by referring to the diagram of connections in Fig. 7. The heating unit of the iron is shown at 75 and is connected to the prongs 54 in the usual manner. When the bar 57 is pushed to the position shown in Fig. 6, the switch in the plug is closed and current flows through the heating unit 75. When in this position, the actuator 68 is flexed. The heating coil for the actuator is connected at one end by a wire 76 to the band 74 so that when the plug is inserted in the casing 55 one end of the heating coil is connected to the actuator itself, and the latter is connected to the contact member 63. When the iron has been heated to a predetermined temperature the pilot switch 51 will be flexed, closing the contact points 52 and 53. This will energize the ground, so that current will now flow through the coil 73, heating the actuator until the latter operates to throw the switch to off position. Current is thereby cut off from the coil 73 as well as from the main resistance unit 75. In due course of time when the iron is cooled sufficiently, the pilot switch will open, but there will be no current flowing through the switch at the time, and consequently there will be no sparking between the contact points 52 and 53.

Obviously it is essential that the plug be inserted in the socket casing 55 right side out else the heating coil 73 will not be energized when the pilot switch is closed. To this end I provide a pin 76 on the plug and a slot 77 in the casing 55 adapted to receive the pin when the plug is inserted right side out. The pin, however, serves as a stop to prevent improper insertion of the plug.

In Fig. 8, I show my automatic switch mechanism applied to a waffle iron. The waffle iron is of the type having an indicating lamp 78 at the top which lights up when the iron has been heated to requisite temperature. In this apparatus, the switch mechanism is similar in general construction to that shown in Fig. 1 with a main switch of the toggle type in the base of the iron, the handle of which switch is shown at 26, and also a pilot switch 36 in the base of the iron. The lamp 78 is connected to the circuit, as shown by broken lines in Fig. 4. One end of the lamp is connected to ground and the other to switch point 46. When the current is applied, the lamp 78 as well as the heating coil 35 will be dead, but as soon as the temperature has risen to such a point as to close the pilot switch the ground will be energized through said pilot switch and this will cause the lamp and the coil 35 to be energized. When the lamp is lighted, the operator will know that sufficient temperature has been reached either to place the batter in the waffle iron, or to remove a baked cake from the waffle iron and at the same time the current is turned off automatically when, or shortly after, this condition is reached, the interval between the closing of the pilot switch and opening of the main switch depending upon the capacity of the resistance unit 35.

Under some conditions, it is desirable to have the current turned on as well as off under thermostatic control and to this end, I provide the construction shown in Fig. 9. In said figure, I show a main switch 80 of the mercury type. The bulb of the switch is provided with a central band 81 formed with trunnion pins 82 which are journaled in a yoke 83. One of the trunnion pins has a bifurcated arm 84 fixed thereon. An actuator 85, similar in form to the actuators 68 and 31, is fixed at one end to a suitable support 86 while the other end projects between the furcations of the arm 84. A heating coil 87 is provided for the actuator. The electrical connections for the switch of this type are similar to those shown in Fig. 5. The arrangement is such that the switch is normally in the "on" position supplying current to a main resistance unit 90. When a predetermined degree of temperature is reached, a pilot switch 91 closes, thereby connecting the heating coil 87 in parallel with the resistance unit 90. When the actuator is flexed by heat generated by the coil 87, the main switch is oscillated to off position, thereby cutting off current from the heating coil 87 as well as from the main resistance unit 90 of the apparatus. When the apparatus has cooled sufficiently for the pilot switch 91 to break the circuit through the coil 87, the actuator will turn the switch 80 back to "on" position. By this means, it is possible to maintain the apparatus between fixed limits of temperature, with the current being turned on and off by the actuator under control of the pilot switch.

In Fig. 10, I show a mercury switch in a connection plug with thermostatic means for turning the current on and off. The construction is similar to that shown in Fig. 6, except that in place of the manually controlled switch, a mercury bulb switch 93 is used. The mercury bulb is provided with an encircling band of metal 94 formed with trunnion pins which are journaled in brackets 95. This plug is adapted to be used in horizontal position, and consequently, the axis of the trunnions is parallel to, or coincides with the longitudinal axis of the plug, so that the bulb will oscillate transversely with respect to the plug. Projecting from the upper side of the band 94 are a pair of pins 96 between which extends one end of a thermostatic actuator 97. The opposite end of the actuator is fixed to a bracket 98 secured to the plug. About the actuator is wound a heating coil 99. The plug is provided with a band of metal 100 at its forward or socket end. A lead wire 101 connects with the usual spring contact 102 in one of the sockets of the plug and the other lead wire 103 runs to a terminal 104. This terminal is connected to one of the contact points 105 of the mercury bulb and the other contact 106 is connected to the other spring contact 107 in the other plug socket. The heating coil 99 is connected at one end to the actuator 97 and the latter is connected by a wire 108 to the terminal 104. The other end of the heating coil 99 is connected by a lead 109 to the band 100.

The operation of this plug switch will be readily apparent. The plug must be inserted in horizontal position into the apparatus which is provided with a pilot switch such as that shown on the flat iron in Fig. 5. The mercury bulb is normally in "on" position and when a predetermined temperature is reached in the apparatus to which the plug is applied, the heating coil 99 will be energized by the closing of the pilot switch and this will cause the actuator to swing the bulb to "off" position. When the apparatus cools below said temperature the heating coil 99 will be deenergized and the actuator will cool off returning the bulb to "on" position. There will be a lag between the "on" and "off" position while the actuator is cooling and this lag may be controlled by proper design of the apparatus.

The construction shown in Fig. 11 is very similar to that shown in Fig. 10. The main difference is that the plug of Fig. 11 is adapted to be used in a vertical position, or in a position at a decided angle from the horizontal. The main difference between the two structures is the fact that the mercury bulb is mounted to oscillate on an axis which is normal to the longitudinal axis of the plug. In Fig. 11, the same reference numerals are used as in Fig. 10 to indicate corresponding parts. Instead of the two brackets 95, a single double armed bracket 95' is used, the two arms extending on opposite sides of the bulb and providing bearing for the trunnion pins. The actuator 97' is somewhat shorter than the actuator 97 and the end of said actuator plays between the pins 96 projecting from the band 94. The operation of this plug switch is exactly the same as that shown in Fig. 10, except as to direction of oscillation of the mercury bulb.

Obviously, my automatic switch may be adapted for a wide variety of applications and its use is not limited to the particular apparatus chosen for illustration. I also reserve the right to make such changes in form, construction and arrangements of parts as fall within the spirit and scope of the following claims.

I claim:
1. The combination with an electric two position snap switch, of a single manual means for throwing the switch to either of its two positions and a thermostat having a link connection with said switch and including a bimetal member adapted when heated to warp and thereby move the switch from one of its positions to its other position but when cold to yield to movement of the switch to either position.

2. The combination with an electric two position snap switch, of a single manual means for throwing the switch to either on or off position and a thermostat having a link connection therewith to move said switch from its on position to its off position when the thermostat is heated and to thereafter return to position permitting either manually on or off position of said snap switch by movement of said single manual means when said thermostat is cold.

3. The combination with an electric two position snap switch including a spring, of a manually operable element for moving the switch toward either of its two positions, said spring effecting completion of such movement to either of said positions and a thermostat connected with said switch and including a bimetal member adapted when heated to warp and thereby move the switch from one of its positions to position where said spring can complete the movement of said switch to its other position but when cold to yield to movement of the switch to either position.

4. The combination with an electric two position snap switch including a spring, of a manually operable element for moving the switch toward either on or off position, said spring effecting completion of such movement to either of said positions and a thermostat connected therewith to move said switch from its on position to position where said spring can complete the movement of said switch to its off position when the thermostat is heated and to thereafter return to position permitting either manually on or off position of said snap switch by movement of said single manual means when said thermostat is cold.

JOHN E. SMITH.